(12) United States Patent
Maleki et al.

(10) Patent No.: US 10,533,442 B2
(45) Date of Patent: Jan. 14, 2020

(54) GAS TURBINE MEMBRANE SEAL

(71) Applicant: ANSALDO ENERGIA SWITZERLAND AG, Baden (CH)

(72) Inventors: Milad Maleki, Baden (CH); Robert Przybyl, Würenlingen (CH); Thomas Huber, Dietikon (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 531 days.

(21) Appl. No.: 15/237,145

(22) Filed: Aug. 15, 2016

(65) Prior Publication Data

US 2017/0044916 A1 Feb. 16, 2017

(30) Foreign Application Priority Data

Aug. 14, 2015 (EP) .................................... 15181039

(51) Int. Cl.
*F01D 11/00* (2006.01)
*F01D 25/24* (2006.01)
(Continued)

(52) U.S. Cl.
CPC .......... *F01D 11/003* (2013.01); *F01D 11/005* (2013.01); *F01D 25/246* (2013.01);
(Continued)

(58) Field of Classification Search
CPC .... F01D 11/003; F01D 25/246; F01D 11/005; F16J 3/02; F23R 3/60; F05D 2240/35;
(Continued)

(56) References Cited

U.S. PATENT DOCUMENTS 2,875,917 A 3/1959 Alkire
3,304,360 A * 2/1967 Hadley ................ H05K 9/0016
174/367
(Continued)

FOREIGN PATENT DOCUMENTS

CN 101205814 A 6/2008
CN 101253352 A 8/2008
(Continued)

OTHER PUBLICATIONS

European Search Report dated Jan. 21, 2016, by the European Patent Office for Application No. 15181039.7.
(Continued)

*Primary Examiner* — J. Todd Newton
(74) *Attorney, Agent, or Firm* — Buchanan Ingersoll & Rooney PC

(57) ABSTRACT

A gas turbine membrane seal is disclosed. The gas turbine membrane seal includes a membrane, the membrane configured and arranged to extend from a first gas turbine component to a second gas turbine component and to separate two volumes, and an anti-fretting part configured and arranged to be attached to the first gas turbine component. A face of the anti-fretting part is adjacent to the membrane, and the face of the anti-fretting part is convex. Further embodiments of the gas turbine membrane seal are also described, along with a gas turbine having the gas turbine membrane seal and a retrofitting method.

11 Claims, 5 Drawing Sheets

(51) Int. Cl.
*F23R 3/60* (2006.01)
*F16J 3/02* (2006.01)

(52) U.S. Cl.
CPC .................. *F16J 3/02* (2013.01); *F23R 3/60* (2013.01); *F05D 2220/32* (2013.01); *F05D 2230/80* (2013.01); *F05D 2240/35* (2013.01); *F05D 2250/711* (2013.01)

(58) Field of Classification Search
CPC ............. F05D 2230/80; F05D 2220/32; F05D 2250/711
USPC .......................................................... 60/752
See application file for complete search history.

(56) References Cited

U.S. PATENT DOCUMENTS

| | | | | | |
|---|---|---|---|---|---|
| 4,537,024 | A | * | 8/1985 | Grosjean | F01D 11/005 415/139 |
| 4,746,129 | A | * | 5/1988 | Puccio | E01D 19/06 277/641 |
| 5,624,227 | A | * | 4/1997 | Farrell | F01D 11/005 277/644 |
| 5,716,158 | A | * | 2/1998 | Hahn | F16B 5/0692 285/187 |
| 5,823,741 | A | * | 10/1998 | Predmore | F01D 11/005 415/134 |
| 6,261,063 | B1 | * | 7/2001 | Chikami | F01D 5/066 416/198 A |
| 6,431,825 | B1 | * | 8/2002 | McLean | F01D 11/005 277/644 |
| 6,722,850 | B2 | * | 4/2004 | Burdgick | F01D 11/003 277/416 |
| 6,857,849 | B2 | * | 2/2005 | Hirst | F01D 11/005 277/626 |
| 7,334,800 | B2 | * | 2/2008 | Minnich | F01D 11/005 277/644 |
| 7,360,769 | B2 | * | 4/2008 | Bennett | F01D 11/005 277/641 |
| 7,527,472 | B2 | * | 5/2009 | Allen | F01D 11/008 277/648 |
| 7,788,932 | B2 | * | 9/2010 | Kunitake | F01D 9/023 60/797 |
| 8,123,232 | B2 | * | 2/2012 | Fujimoto | F01D 9/023 277/644 |
| 8,181,972 | B2 | * | 5/2012 | Tsuji | F16K 51/02 277/641 |
| 8,231,352 | B2 | * | 7/2012 | Hunt | F01D 5/22 277/641 |
| 8,459,041 | B2 | * | 6/2013 | Flanagan | F01D 9/023 60/752 |
| 8,821,114 | B2 | * | 9/2014 | Afanasiev | F01D 11/005 415/170.1 |
| 9,017,015 | B2 | * | 4/2015 | Casavant | F01D 25/26 415/134 |
| 9,243,510 | B2 | * | 1/2016 | Casavant | F01D 11/005 |
| 10,107,129 | B2 | * | 10/2018 | McCaffrey | F01D 11/025 |
| 2004/0173975 | A1 | * | 9/2004 | Hirst | F01D 11/005 277/603 |
| 2005/0179215 | A1 | * | 8/2005 | Kono | F01D 11/005 277/628 |
| 2014/0346741 | A1 | * | 11/2014 | Takagi | F01D 11/003 277/641 |
| 2015/0102566 | A1 | * | 4/2015 | Hanumanthan | F01D 11/005 277/591 |
| 2016/0177767 | A1 | * | 6/2016 | Slavens | F04D 29/083 277/591 |
| 2016/0215644 | A1 | * | 7/2016 | Snyder | F01D 11/005 |

FOREIGN PATENT DOCUMENTS

| | | |
|---|---|---|
| CN | 104727861 A | 6/2015 |
| EP | 2 813 670 A2 | 12/2014 |
| GB | 2 396 193 A | 6/2004 |

OTHER PUBLICATIONS

Office Action dated Aug. 29, 2019 and National Intellectual Property Administratoin, P.R. China Search Report dated Aug. 22, 2019, in in corresponding Chinese Patent Application No. 201610659625.8 with English Translation (12 pages).

* cited by examiner

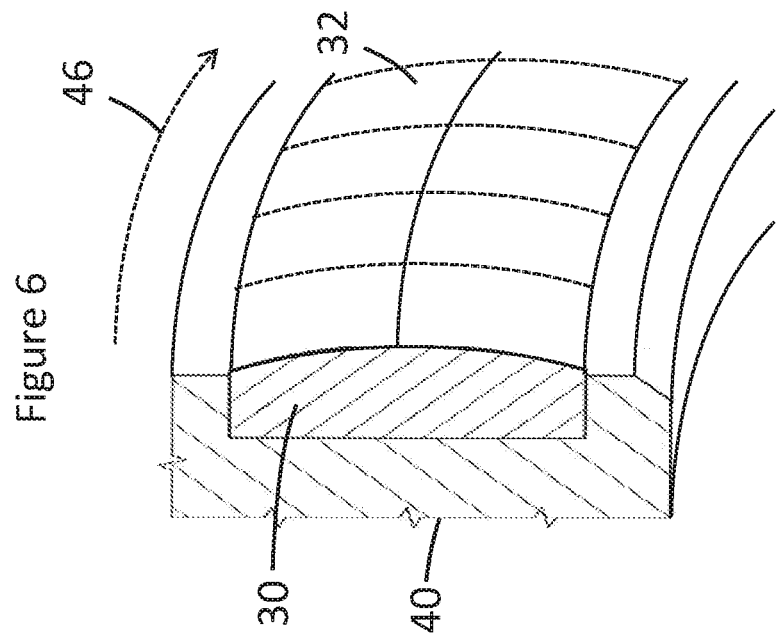
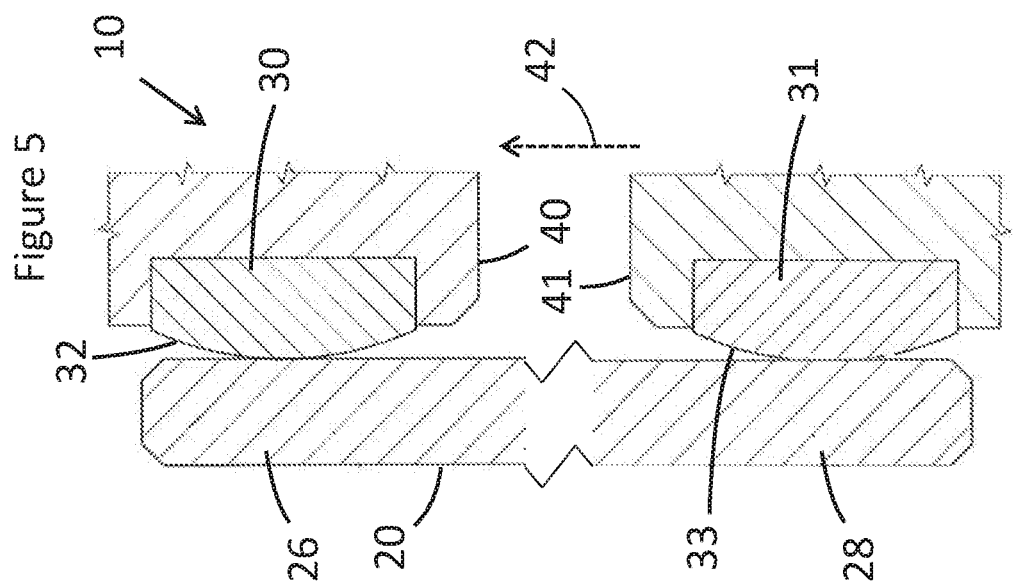

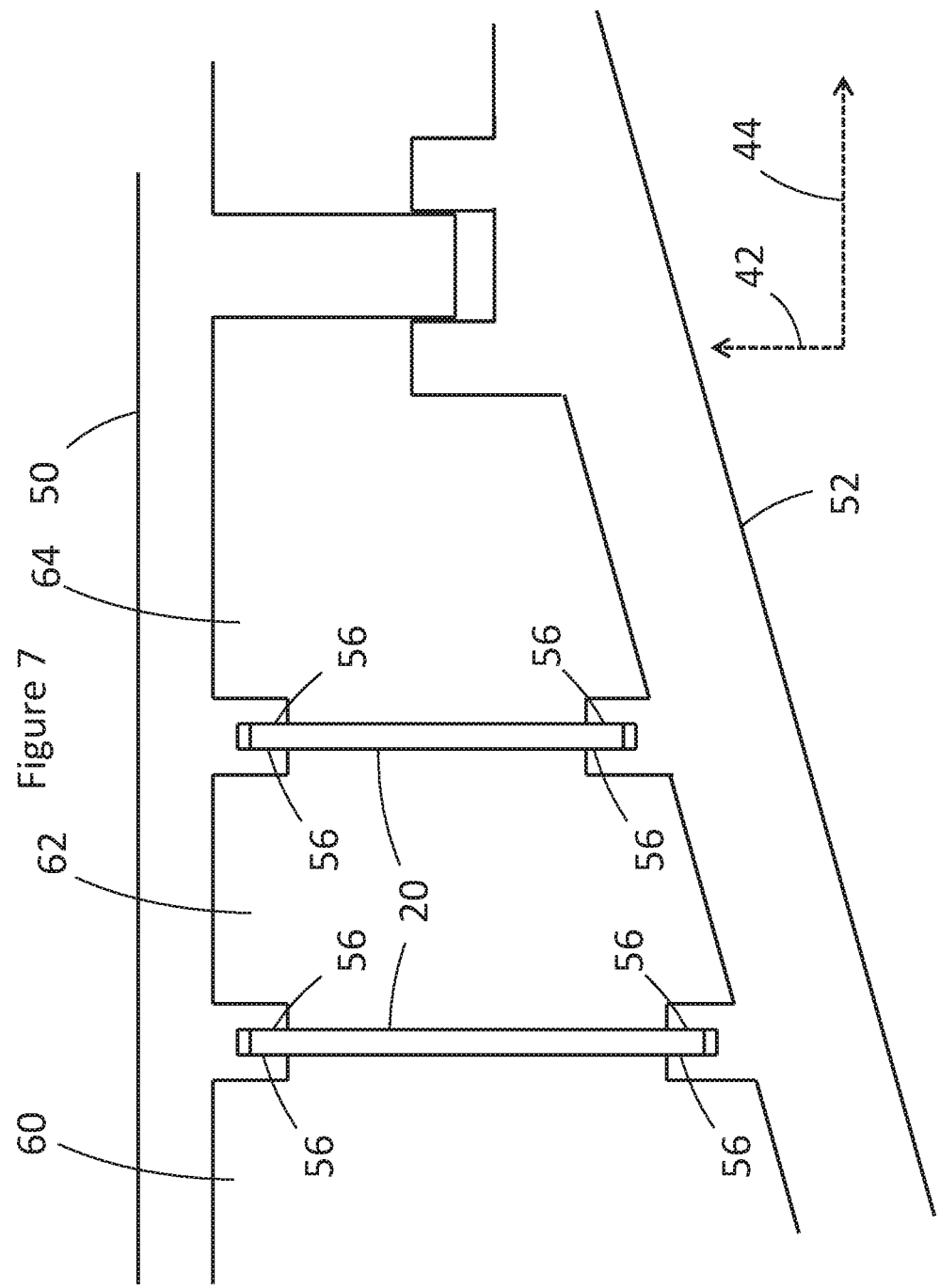

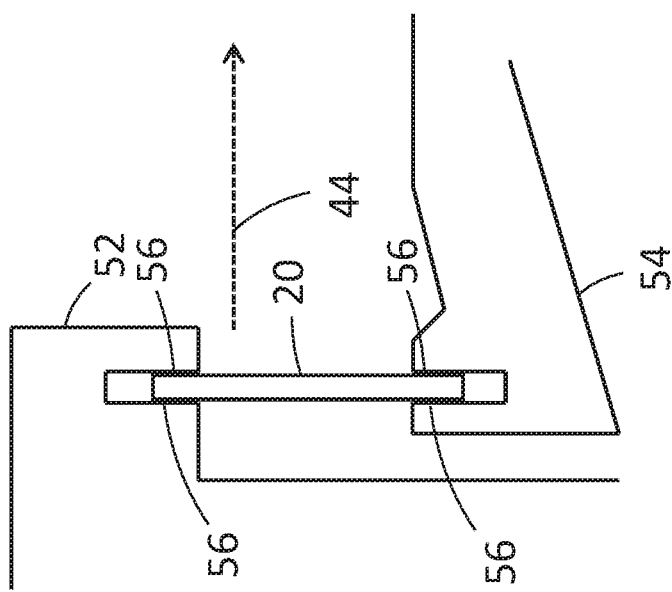

GAS TURBINE MEMBRANE SEAL

TECHNICAL FIELD

The present disclosure relates to gas turbine membrane seals, and particularly to gas turbine membrane seals with a membrane and an anti-fretting part.

BACKGROUND OF THE INVENTION

Modern gas turbines are extremely complex and include a large number of seals to reduce leakage through various cavities and gaps, helping to control flow of the various fluids around the gas turbine. One such type of seal is the membrane seal, and U.S. Pat. No. 6,857,849, a granted patent assigned to the current applicant, shows an example of a known membrane seal. Known membrane seals such as that described in U.S. Pat. No. 6,857,849 can provide an effective seal, but tend to have a relatively short lifetime and can often require replacing due to wear. The replacement frequency is greater when the sliding distance and pressure difference at the side of membrane is relatively high. It has therefore been appreciated that the existing designs can be further improved.

SUMMARY OF THE INVENTION

A first aspect provides a gas turbine membrane seal comprising a membrane configured and arranged to extend from a first gas turbine component to a second gas turbine component and to separate two volumes, and an anti-fretting part configured and arranged to be attached to said first gas turbine component, wherein a face of the anti-fretting part is adjacent to the membrane, and wherein the face of the anti-fretting part is convex.

In a membrane seal where the curved surface is on the membrane and the flat surface is on the adjacent gas turbine component, the curved surface of the membrane is always in contact with the adjacent gas turbine component, and will therefore always be in a position to wear. In other words, the curved surface of the membrane is subjected to a higher contact sliding distance during operation compared to the flat contact surface on the anti-fretting part (fretting ring) and thus is more prone to fretting wear. As a result, membrane seals can require frequent replacement during use due to high rates of wear, while the anti-fretting part, which is generally cheaper, remains unworn.

In contrast, a membrane seal as described above provides the curved surface (convex surface) on an anti-fretting ring on the gas turbine component, and therefore it is the anti-fretting part that is always in contact with the membrane and liable to wear. This can reduce the membrane replacement frequency, and can provide good membrane lifetime despite high contact pressure and large relative gas turbine component displacement. This can reduce maintenance costs as it is generally cheaper to replace an anti-fretting ring than to replace a membrane.

The sealing efficiency of contact surfaces between the membrane and the anti-fretting ring normally depends on the surface condition, and it is therefore generally preferable to minimise wear and thereby minimise leakage. The present design can provide reduced wear and therefore reduced leakage, which can improve engine efficiency and power.

Preferably, the face of the anti-fretting part has a plurality of separate convex portions. The second convex portion can provide a backup contact seal in case of wear of the first convex portion.

Preferably, the membrane is planar. This provides a flat surface for the anti-fretting part to contact. Preferably, the anti-fretting part is a first anti-fretting part and the membrane has a first face adjacent to the first anti-fretting part and a second face facing away from the first anti-fretting part, and wherein the gas turbine membrane seal comprises a second anti-fretting part adjacent to the second face of the membrane.

Preferably, at least the face of the anti-fretting part is made of a softer material than the membrane. This can reduce membrane wear, as the anti-fretting part has lower wear resistance and will wear more than the membrane.

A second aspect provides a gas turbine comprising a first gas turbine component, a second gas turbine component and a gas turbine membrane seal as described above. Preferably, the first gas turbine component is a turbine vane carrier and the second gas turbine component is a turbine housing or a combustor liner carrier, or the first gas turbine component is a turbine housing or a combustor liner carrier and the second gas turbine component is a turbine housing.

A third aspect provides a method of retrofit for a gas turbine, comprising the steps of removing an existing membrane seal and inserting a gas turbine membrane seal as described above.

BRIEF DESCRIPTION OF THE DRAWINGS

An embodiment of the invention will now be described by way of example only and with reference to the accompanying drawings in which:

FIG. 5 shows a cross section of another membrane seal with two anti-fretting rings;

FIG. 6 shows a perspective view of the anti-fretting ring extending in the circumferential direction;

FIG. 7 shows a cross section of a gas turbine showing possible locations for a membrane seal; and FIG. 8 shows a cross section of a gas turbine showing further possible locations for a membrane seal.

DETAILED DESCRIPTION OF THE PREFERRED EMBODIMENTS

Figure 1:
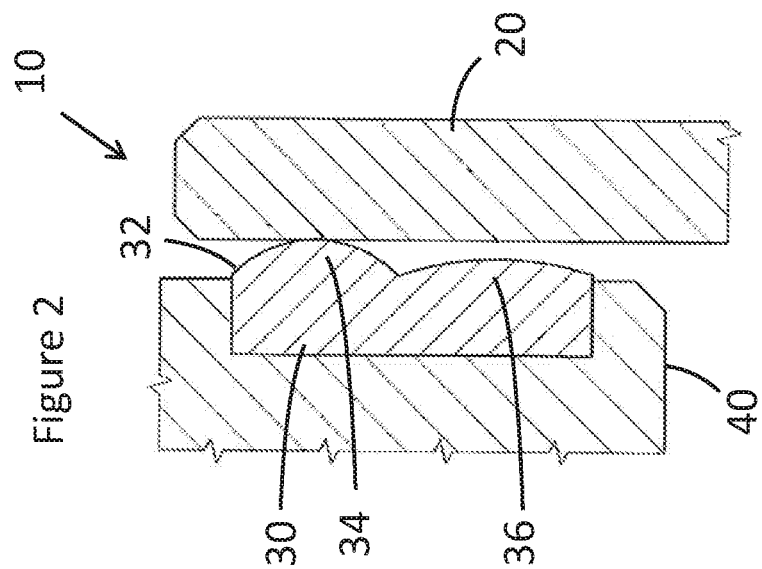
FIG. 1 shows a cross section of a membrane seal.

FIG. 1 shows a membrane seal 10 (also known as a cavity splitter or a large cavity splitter) comprising a membrane 20 and an anti-fretting part 30, such as an anti-fretting ring or an anti-fretting ring section. The membrane 20 adjacent to a face 32 of the anti-fretting ring 30; the face 32 is convex. The anti-fretting ring is attached to a first gas turbine component 40.

Figure 2:
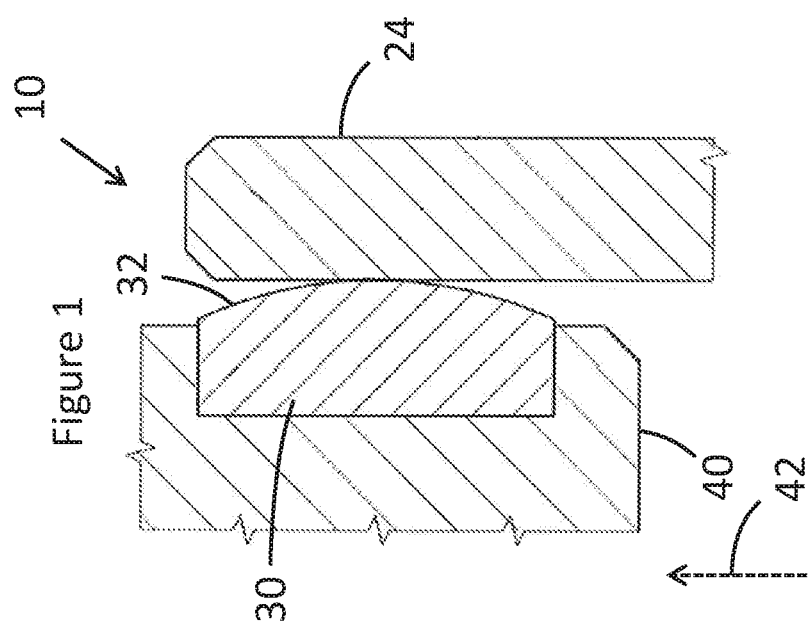
FIG. 2 shows a cross section of another example of a membrane seal.

FIG. 2 shows a membrane seal 10 with a different anti-fretting ring 30. The face 32 of the anti-fretting ring shown in FIG. 1 is convex with a single convex portion; the membrane seal of FIG. 2 has a first convex portion 34 and a second convex portion 36. The first convex portion 34 is in contact with the membrane 20, and the second convex portion 36 is spaced apart from the membrane 20.

Figure 3:
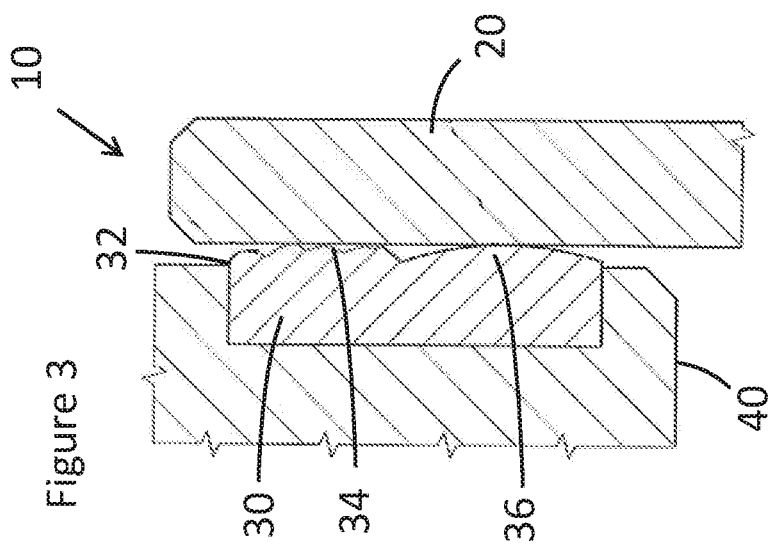
FIG. 3 shows a cross section of the membrane seal of FIG. 2 after wear of part of the anti-fretting ring.

When in use, the first convex portion 34 may become worn as shown in FIG. 3. After a certain amount of wear of the first convex portion 34, the second convex portion 36 is also in contact with the membrane.

Figure 4:
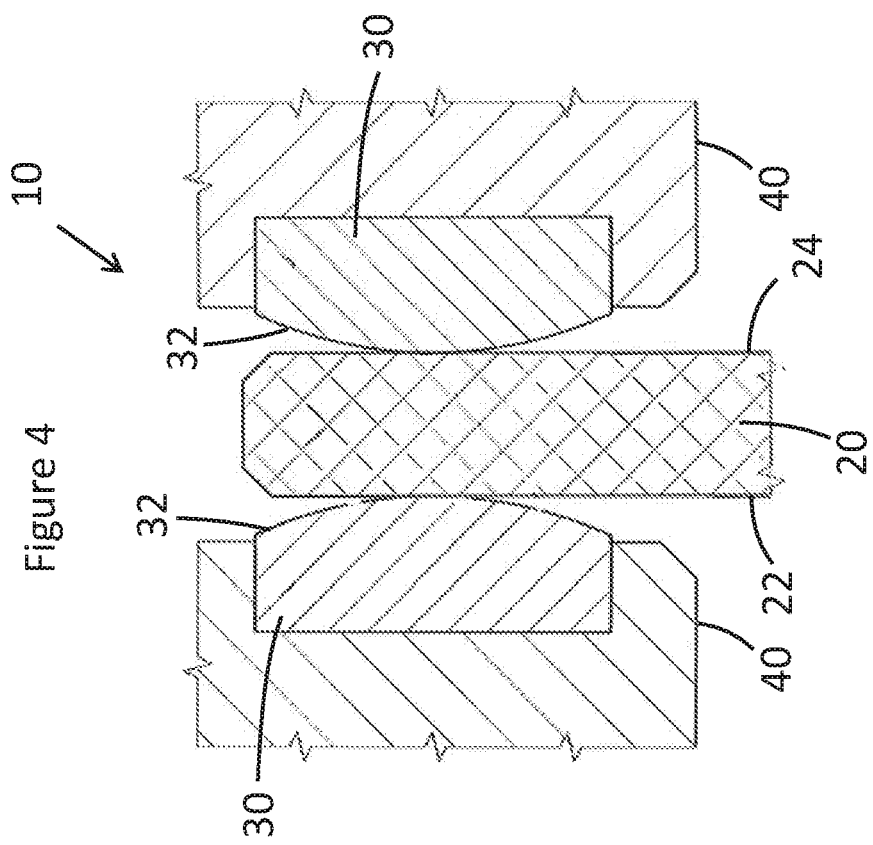
FIG. 4 shows a cross section of a membrane seal with two anti-fretting rings.

FIG. 4 shows a membrane seal in which the membrane 20 has two anti-fretting rings 30, one arranged adjacent to a first face 22 of the membrane and the other adjacent to a second face 24 of the membrane. The first face 22 faces in the opposite direction to the second face 24. Both anti-fretting rings are attached to the first gas turbine component 40.

FIG. 5 shows a membrane seal in which the membrane has two anti-fretting rings on the same face, arranged at opposite ends (first end 26 and second end 28) of the membrane in a radial direction 42 relative to a longitudinal gas turbine axis (which extends in an axial direction 44). The first anti-fretting ring 30 is attached to a first gas turbine component 40, and the second anti-fretting ring 31 is attached to a second gas turbine component 41.

FIG. 6 shows a perspective view of part of a membrane, showing the curvature of the anti-fretting ring 30 and the first gas turbine component in the circumferential direction 46.

FIG. 7 shows a turbine housing 50 and a turbine vane carrier 52. Two membranes 20 extend between the turbine housing 50 and the turbine vane carrier 52. In total, there are eight places on FIG. 7 where an anti-fretting ring could be arranged between a membrane and an adjacent gas turbine component (turbine housing or turbine vane carrier); these are indicated with the reference numeral 56.

FIG. 8 shows a turbine vane carrier 52 and a combustor liner carrier 54. A membrane 20 extends between the turbine vane carrier 52 and the combustor liner carrier 54. As in FIG. 7, the places where an anti-fretting ring could be arranged between the membrane and an adjacent gas turbine component (turbine housing or combustor liner carrier) are indicated with the reference numeral 56.

A more detailed example of where a membrane seal is located is given with reference to FIG. 7. A cavity is divided into three parts 60, 62, 64 by the two membrane seals 10. When in use, the first part 60 is at a higher pressure from the second part 62, and the second part is at a higher pressure than the third part 64. This means that the membrane seal between the second part and the third part, for example, is pushed towards the third cavity 64 by the pressure in the second cavity 62. As a result, it could be useful to put anti-fretting rings 30 at the two locations 56 between the membrane 20 and the two adjacent gas turbine components (turbine vane carrier, turbine housing) on the side of the membrane facing the third cavity 64 (the right-hand side in FIG. 7), to help reduce rubbing and wear. This would give a membrane seal similar to the one shown in FIG. 5.

Planar cross sections are shown in most of the Figures, extending in the radial direction 42 and the axial direction 44. Generally, the parts described in this application also extend in a circumferential direction 46 relative to a central axis, which would normally be the longitudinal gas turbine axis (extending in the axial direction 44) around which the rotating parts of the gas turbine rotate. For example, the membranes and the anti-fretting rings normally extend in a circumferential direction 46, and each can either be a full ring or ring segments.

The membrane 20 may be a flat plate. That is, the membrane may be planar, normally extending in the radial direction 42 and the circumferential direction 46. The membrane separates two volumes and extends from a first gas turbine component to a second gas turbine component.

The anti-fretting part 30 may be a ring or a ring section or any other appropriate shape. In the examples shown in FIGS. 7 and 8, the anti-fretting part would normally be a ring or a ring section.

The anti-fretting rings 30 described herein are attached to gas turbine components, and are shown in cavities within the gas turbine components. Variations in this design are possible; for example, an anti-fretting ring may alternatively be attached directly to the surface of a gas turbine component rather than in a cavity.

In some cases, only a single anti-fretting ring is necessary, for example in a location where there is a particular problem with rubbing. In some cases, it may be preferable to put anti-fretting rings on both sides, as shown in FIG. 4. In some case, it may be preferable to put anti-fretting rings at both ends on one side, as shown in FIG. 5. This may be the case, for example, where the pressure difference between the two faces 22, 24 of the membrane means that most of the rubbing occurs only on one face of the membrane. Any combination is also possible, with anti-fretting rings at one or both sides and/or one or both ends 26, 28 (in the radial direction 42) of the membrane.

The second anti-fretting ring 31 and the face 33 of the second anti-fretting ring are equivalent to the anti-fretting ring 30 and the face 32 of the anti-fretting ring 30 as described in this application, and may have the same designs and design variations.

The face 32 of the anti-fretting ring is adjacent to a face of the membrane, and is preferably in contact with the face of the membrane.

The face 32 of the anti-fretting rings described herein is convex. This effectively means that the face is not planar, and that it bulges outwards from the body of the anti-fretting ring. As a result, only a portion of the face 32, 33 can be in contact with the adjacent membrane when the anti-fretting ring is newly installed.

The convex face of the anti-fretting ring will normally be curved in the radial direction 42 so that when the gas turbine is in use and the gas turbine components are moving relative to one another the membrane moves relative to the face. This typically means that the face of the anti-fretting ring is convex when viewed in cross section in a plane containing the radial direction 41 and the axial direction 44. In the circumferential direction 46, the shape of the face of the anti-fretting ring normally remains constant, as shown in FIG. 6.

The anti-fretting ring is preferably made of a softer material than the membrane. As an example, an anti-fretting ring and the membrane may be made of different types of steel, such as an anti-fretting ring made of low alloy steel (content other than iron and carbon: 4% or less by weight) and a membrane made of high alloy steel (content other than iron and carbon: higher than 4% by weight). The entire anti-fretting ring can be made of a softer material than the membrane. Alternatively, just the face of the anti-fretting ring can be made of a softer material than the membrane, with the rest of the anti-fretting ring being made of a different material. Alternatively, when the membrane is made of low alloy steels, the contact surface of the membrane can be nitrated/carburized to present a relative higher strength on the face of the membrane than on than anti-fretting ring. The Mohs Scale, for example, may be used to measure the relative hardness of the materials.

Where a plurality of separate convex portions are provided, for example a first convex portion and a second convex portion (see FIG. 2), the first and second convex portions are generally at different points in the radial direction 42 (so at different distances from the gas turbine axis), and can also be adjacent in the radial direction 42. In FIG. 2, the convex portion 34 closest to the end of the membrane (furthest from the gas turbine axis) is the portion closest to the membrane, but the other convex portion 32 could alternatively be the portion closest to the membrane. Examples with one or two convex portions are shown above, but three or more convex portions may also be provided. When newly installed, the second convex portion is normally further from the membrane than the first convex portion. When more than two convex portions are provided, the convex portions would normally all be at a different distance from the membrane than each other. Each convex portion effectively has a peak, and once the peak of one convex portion has worn down then the peak of the next convex portion can come into contact with the membrane.

In the example shown in FIG. 4, both anti-fretting rings are normally attached to the same gas turbine component (first gas turbine component 40).

The membrane seals described in this application can be used in various places in a gas turbine, including those shown in FIGS. 7 and 8 and also elsewhere, for example between other inner casings and outer casings in a gas turbine. The membrane seals can be fitted into a new gas turbine or retrofitted into an existing gas turbine by removing an existing membrane seal and inserting a membrane seal as described herein.

Membrane seals can be used to separate various cavities, such as those with different pressures, temperatures or contents (e.g. two different gases). The cavities being separated are normally between two components that may move relative to one another; the relative movement means that a seal is required that allows relative movement of the two components. As a result, the first gas turbine component 40 and second gas turbine component 41 can be various components, including those shown in FIGS. 7 and 8 (turbine housing 50, turbine vane carrier 52, combustor liner carrier 54), and the first and second gas turbine components can normally move relative to one another during use of a gas turbine. A gas turbine comprises a compressor, a combustor and a turbine, and may also comprise various other parts, such as a turbine housing, a turbine vane carrier and a combustor liner carrier.

The combustor liner carrier 54 may be an outer liner carrier for a sequential environmental (SEV) combustor.

Various modifications to the embodiments described are possible and will occur to those skilled in the art without departing from the invention which is defined by the following claims.

| REFERENCE NUMERALS | |
|---|---|
| 10 | membrane seal |
| 20 | membrane |
| 22 | first face of the membrane |
| 24 | second face of the membrane |
| 26 | first end of the membrane |
| 28 | second end of the membrane |
| 30 | anti-fretting ring |
| 31 | second anti-fretting ring |
| 32 | face of the anti-fretting ring |
| 33 | face of the second anti-fretting ring |
| 34 | first convex portion |
| 36 | second convex portion |
| 40 | first gas turbine component |
| 41 | second gas turbine component |
| 42 | radial direction |
| 44 | axial direction |
| 46 | circumferential direction |
| 50 | turbine housing |
| 52 | turbine vane carrier |
| 54 | combustor liner carrier |
| 56 | anti-fretting ring location |

-continued

| REFERENCE NUMERALS | |
|---|---|
| 60 | first part of the cavity |
| 62 | second part of the cavity |
| 64 | third part of the cavity |

The invention claimed is:

1. A gas turbine membrane seal comprising:
a membrane configured and arranged to extend from a first gas turbine component to a second gas turbine component and to separate two volumes, and
an anti-fretting part configured and arranged to be attached to said first gas turbine component,
wherein a face of the anti-fretting part is adjacent to the membrane, and
wherein the entire face of the anti-fretting part is convex.

2. The gas turbine membrane seal of claim 1, wherein the membrane is planar.

3. The gas turbine membrane seal of claim 1, wherein the anti-fretting part is a first anti-fretting part and the membrane has a first face adjacent to the first anti-fretting part and a second face facing away from the first anti-fretting part, and wherein the gas turbine membrane seal comprises:
a second anti-fretting part adjacent to the second face of the membrane.

4. The gas turbine membrane seal of claim 1, wherein at least the face of the anti-fretting part is made of a softer material than the membrane.

5. A gas turbine membrane seal comprising:
a membrane configured and arranged to extend from a first gas turbine component to a second gas turbine component and to separate two volumes, and
an anti-fretting part configured and arranged to be attached to said first gas turbine component,
wherein a face of the anti-fretting part is adjacent to the membrane, and
the face of the anti-fretting part has a plurality of separate convex portions, each having a different height.

6. A gas turbine seal of claim 5, wherein each of the plurality of separate convex portions is convex in the same direction.

7. A gas turbine comprising:
a first gas turbine component;
a second gas turbine component; and
a gas turbine membrane seal according to claim 1.

8. The gas turbine of claim 7, wherein the first gas turbine component is a turbine vane carrier and the second gas turbine component is a turbine housing or a combustor liner carrier, or the first gas turbine component is a turbine housing or a combustor liner carrier and the second gas turbine component is a turbine housing.

9. A method of retrofitting an existing membrane seal for a gas turbine, comprising:
removing the existing membrane seal;
inserting a new gas turbine membrane seal, having a membrane configured and arranged to extend from a first gas turbine component to a second gas turbine component and to separate two volumes, and an anti-fretting part configured and arranged to be attached to said first gas turbine component, wherein the entire face of the anti-fretting part is convex: and
arranging the convex face of the anti-fretting part adjacent to the membrane.

10. The method of claim 9, wherein each of the plurality of separate convex portions is convex in the same direction.

11. A method of retrofitting an existing membrane seal for a gas turbine, comprising:
   removing the existing membrane seal;
   inserting a new gas turbine membrane seal, having a membrane configured and arranged to extend from a first gas turbine component to a second gas turbine component and to separate two volumes, and an anti-fretting part configured and arranged to be attached to said first gas turbine component, wherein the face of the anti-fretting part has a plurality of separate convex parts, each having a different height; and
   arranging the convex faces of the anti-fretting part adjacent to the membrane.

\* \* \* \* \*